United States Patent Office 3,149,124
Patented Sept. 15, 1964

---

3,149,124
FLUORINATED TETRAHYDRO-THIOPHENES AND SELENOPHENES AND RELATED PRODUCTS
Carl G. Krespan, Wilmington, Del., assignor to E. I. du Pont de Nemours and Company, Wilmington, Del., a corporation of Delaware
No Drawing. Filed June 23, 1961, Ser. No. 119,026
13 Claims. (Cl. 260—332.2)

This invention relates to a new class of fluorine-containing heterocyclic compounds. More particularly, it relates to compounds containing a fluorine-substituted thiolane or selenolane nucleus.

In spite of the growing importance of fluorinated organic compounds, only very few fluorine-substituted heterocyclic structures are known. In particular, prior to my U.S. Patent 2,931,803, there were no published reports of fluorine-substituted five-membered ring structures in which one of the ring members is sulfur or selenium.

In my U.S. Patent 2,931,803, there is described the direct, one-step combination of tetrafluoroethylene with sulfur or selenium, whereby perfluoroheterocyclic compounds of sulfur or selenium are obtained among the reaction products. It has now been found that a similar one-step reaction takes place between tetrafluoroethylene (or related perhaloethylene), a different unsaturated compound, and sulfur or selenium, whereby there is obtained directly, and from readily available reactants, a fluorine-substituted thiolane or selenolane, i.e., a fluorine-substituted heterocyclic containing the structure

where Q is sulfur or selenium.

This application is a continuation-in-part of my copending application Ser. No. 722,648, filed March 20, 1958, now abandoned, which in turn was a continuation-in-part of my application Ser. No. 678,451, filed August 15, 1957, and now U.S. Patent 2,931,803 which was a continuation-in-part of my application Ser. No. 595,126, field July 2, 1956, and now abandoned.

In the discussion which follows, sulfur and selenium will be sometimes grouped together under the expression "chalcogen of atomic number 16 to 34." The term "chalcogen" designates the elements oxygen, sulfur, selenium, and tellurium, see Rules for Naming Inorganic Compounds in J. Am. Chem. Soc. 63, 889–897 (1941) at p. 892. Thus, sulfur is the chalcogen of atomic number 16 and selenium the chalcogen of atomic number 34.

It is an object of this invention to provide a new class of fluorine-contining heterocyclic compounds and a novel process for their preparation. A further object is to provide novel adducts of a perhaloethylene, a different unsaturated compound, and sulfur or selenium, which adducts contain a fluorine-substituted thiolane or selenolane nucleus. Other objects will appear hereinafter.

These and other objects of this invention are accomplished by providing an adduct of one mole of a perhaloethylene $CF_2=C(X)(X')$, wherein X and X', which may be the same or different, are halogen of atomic number 9 to 35, one mole of a chalcogen of atomic number 16 to 34, and one mole of an unsaturate containing one non-aromatic carbon-to-carbon double bond, said adduct having one of the formulas (I)

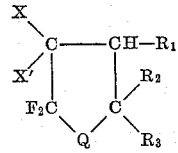

where Q is sulfur or selenium; X and X', which may be the same or different, are fluorine, chlorine or bromine; $R_1$ is hydrogen or alkyl of 1 to 6 carbon atoms; $R_2$ is hydrogen, halogen, or alkyl of 1 to 6 carbon atoms; and $R_3$ is hydrogen, halogen, cyano, hydroxymethyl, hydrocarbon or halohydrocarbon of 1 to 6 carbon atoms free of non-aromatic unsaturation (i.e., in which any unsaturation is aromatic), $-OR_4$, $-COOR_4$ or $-OCOR_4$, $R_4$ being hydrocarbon of 1 to 6 carbon atoms free of non-aromatic unsaturation, at least one of $R_1$, $R_2$ and $R_3$ being hydrogen, and the substituents $R_1$, $R_2$ and $R_3$ together having a total of not more than 12 carbon atoms; and (II)

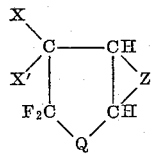

where Q, X and X' are as above and Z is a divalent polymethylene radical of 2 to 4 carbon atoms or the anhydride radical,

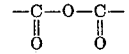

These new compounds, which are generically designated as 2,2-difluoro-3,3-dihalothiolanes or 2,2-difluoro-3,3-dihaloselenolanes, are prepared by heating at a temperature within the range of 100 to 300° C. an intimate mixture of (a) a chalcogen of atomic number 16 to 34, i.e., sulfur or selenium; (b) a perhaloethylene $CF_2=C(X)(X')$, where X and X' are as defined above; and (c) another unsaturated compound of up to 14 carbon atoms and having one non-aromatic carbon-to-carbon double bond, said unsaturated compound having one of the formulas (III)

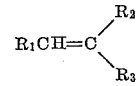

or (IV)

wherein the symbols $R_1$, $R_2$, $R_3$ and Z have the previously stated significance, and isolating the fluorinated heterocyclic compound thus obtained.

The reaction is entirely general and applicable to any perhaloethylene as defined and to any dissimilar unsaturated compound as defined. The substituents or radicals $R_1$, $R_2$, $R_3$ and Z of the unsaturated compound do not participate in the reaction and appear unchanged in the resulting heterocyclic reaction product. There are, of course, differences in the reactivity of the various reactants and, accordingly, in the ease of formation and yield of the desired reaction product. For this reason, and for reasons of availability of the starting materials, certain groups of reactants and of reaction products are preferred.

The preferred reactants, which may be used alone or in combination, are sulfur, tetrafluoroethylene, i.e., $CF_2=C(X)(X')$, where X and X' are fluorine, and unsaturated compounds of the formula $CH_2=CH-R_3$, where $R_3$ is as defined above, i.e., the preferred unsaturates are those of Formula III where $R_1$ and $R_2$ are hydrogen.

Thus, the preferred products are those obtained by using one or more of the preferred reactants, the most preferred being thiolanes of the formula

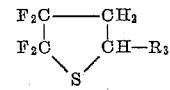

which are prepared by reacting sulfur and tetrafluoroethylene with $CH_2=CH-R_3$.

As stated above, the heterocyclic compounds of this invention are prepared by heating together elemental sulfur or selenium, a perhaloethylene $CF_2=C(X)(X')$ and a compound having one non-aromatic carbon-to-carbon double bond. Since the perhaloethylenes are gaseous or low boiling, the reaction is conveniently carried out in a sealed, pressure-resistant vessel. The operating pressure is not critical. Normally, the reaction is carried out under the autogenous pressure developed by the reactants at the operating temperature, but an additional pressure of either the perhaloethylene or the other unsaturate, if gaseous, or of an inert gas such as nitrogen can be used if desired. Thus, the total pressure can be as high as the equipment can withstand. For example, it can be as high as 5000 atmospheres or even higher.

The reaction proceeds at an impractically slow rate at temperatures below about 100° C. It is therefore desirable to operate at at least 100° C. and preferably at least 125° C. While the reaction temperature can be as high as the decomposition point of reactants or reaction products, it is in general unnecessary to exceed about 300° C., the preferred temperature range being 125–250° C.

The relative proportions of the three reactants are not critical. They are important only to the extent that it is desired to utilize the more expensive chemicals most efficiently. Generally, the chalcogen and the perhaloethylene are used in approximately equivalent molar ratios, e.g., between 0.75 and 1.5 mole of perhaloethylene per mole of chalcogen, and the other unsaturate is used in amounts of between 0.5 and about 2 moles per mole of chalcogen.

A solvent for the reaction is not necessary. However, the reaction is often facilitated and better conversions are achieved through the use of a heat-stable, unpolymerizable, essentially neutral liquid reaction medium free from carbon-to-carbon unsaturation and capable of dissolving the chalcogen used to the extent of at least 0.5% at the operating temperature. Suitable solvents include halogenated hydrocarbons such as chloroform or carbon tetrachloride; acyclic or cyclic ethers such as di-n-butyl ether, dioxane or tetrahydrofuran; carbon disulfide, dimethylformamide, and the like. Carbon disulfide is a particularly preferred solvent.

The reaction needs no catalyst. In some of the examples which follow, iodine was added to the reaction mixture since it has been found to catalyze the formation of cyclic compounds from sulfur or selenium and tetrafluoroethylene as the sole unsaturate. However, the presence of iodine is not necessary, and in fact appears to offer no particular advantage in the reaction of this invention.

If desired, although this is not essential, the perhaloethylene and the other unsaturate can be stabilized against polymerization by addition of a small amount of a conventional inhibitor.

Contact between the reactants should be maintained at least long enough at operating temperature for a practical amount of reaction product to be formed. In practice, a reaction period of two to twelve hours in the preferred temperature range is sufficient, but a shorter or longer reaction period can be used.

The products of this reaction are liquids, or crystalline solids, which can be isolated from the reaction mixture by conventional methods, e.g., distillation at atmospheric or reduced pressure, steam distillation, crystallization from an appropriate solvent or the like. By-products are sometimes formed in substantial amounts. These are principally four-membered cyclic adducts of the perhaloethylene with the other unsaturate (such adducts are described in U.S. Patent 2,462,345). When the perhaloethylene is tetrafluoroethylene, there can also be formed small amounts of perfluorothiolane, with possible traces of perfluorodithiane, or of the corresponding selenium heterocyclics. These compounds are described in my U.S. Patent 2,931,803 already referred to. These various by-products, when they are formed, can be separated from the heterocyclic products of this invention by fractional distillation. Polymeric products, e.g., linear tetrafluoroethylene-sulfur copolymers, or polymers containing all three reactants, form frequently. Their separation from the monomeric heterocyclics offers in general no difficulties.

In a typical mode of operating the process, a bomb-type pressure vessel lined with stainless steel is charged with weighed amounts of sulfur (or selenium), the unsaturated compound if it is relatively non-volatile, and the solvent, if any is used. The bomb is chilled to a low temperature, e.g., that of liquid nitrogen, evacuated free of air, and the desired amount of gaseous reactants, i.e., the perhaloethylene and the unsaturated compound, if the latter is gaseous, is condensed into it. The bomb is sealed, placed in an agitating rack and heated with shaking at the desired temperature, preferably in the range of 125–250° C., for a given period of time, preferably 2–12 hours. Alternatively, only a portion of the required amount of perhaloethylene is charged in the bomb at the beginning, and the remainder is introduced at intervals during the heating period as the pressure inside the bomb decreases. At the end of the heating period, the bomb is cooled to room temperature or below, if desired, and any unreacted gaseous product is bled out. The liquid reaction product is separated from any solid material which may be present, and fractionated at atmospheric or reduced pressure.

The following examples illustrate the invention:

*Example I*

A mixture of 6.4 g. (0.20 mole) of sulfur, 7 g. (0.25 mole) of ethylene and 20 g. (0.20 mole) of tetrafluoroethylene in 20 ml. of carbon disulfide was heated at 150° C. for 2 hours under autogenous pressure. Distillation of the reaction product gave 4.9 g. of a liquid boiling at 74° C. at 150 mm., which was 2,2,3,3-tetrafluorothiolane,

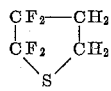

*Analysis.*—Calc'd for $C_4H_4F_4S$: C, 30.00; H, 2.52; S, 20.02; F, 47.46. Found: C, 30.43; H, 2.64; S, 20.14; F, 48.02.

The structure of this product was confirmed by its nuclear magnetic resonance spectrum.

*Example II*

A mixture of 6.4 g. (0.20 mole) of sulfur, 9 g. (0.21 mole) of propylene and 21 g. (0.21 mole) of tetrafluoroethylene in 20 ml. of carbon disulfide was heated at 150° C. for 11 hours under autogenous pressure. Distillation of the liquid reaction product gave 14.4 g. of a colorless, almost odorless liquid boiling at 72° C. at 100 mm., which was 5-methyl-2,2,3,3-tetrafluorothiolane,

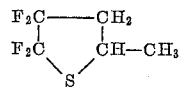

*Analysis.*—Calc'd for $C_5H_6F_4S$: C, 34.48; H, 3.47; F, 43.64; S, 18.41. Found: C, 34.96; H, 3.72; F, 44.34; S, 18.51.

The nuclear magnetic resonance spectrum of this compound clearly indicated that the methyl group was in the 5-position.

*Example III*

A mixture of 6.4 g. (0.20 mole) of sulfur, 11 g. (0.2 mole) of trans-butene-2 and 20.4 g. (0.2 mole) of tetrafluoroethylene in 15 ml. of carbon disulfide was heated at 150° C. for 7 hours under autogenous pressure. Distillation of the reaction product gave 16.6 g. of 4,5-dimethyl-2,2,3,3-tetrafluorothiolane,

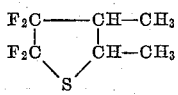

B.P., 80–82° C. at 100 mm.

*Analysis.*—Calc'd for $C_6H_8F_4S$: C, 38.29; H, 4.28; F, 40.39; S, 17.04. Found: C, 38.53; H, 4.49; F, 40.71; S, 16.76.

Nuclear magnetic resonance analysis indicated that both of the two possible racemates of this compound were present.

*Example IV*

A mixture of 6.4 g. (0.20 mole) of sulfur, 10 g. (0.18 mole) of isobutylene and 19.3 g. (0.19 mole) of tetrafluoroethylene in 20 ml. of carbon disulfide was heated at 150° C. for 8 hours under autogenous pressure. There was obtained by distillation 14.4 g. of 5,5-dimethyl-2,2,3,3-tetrafluorothiolane,

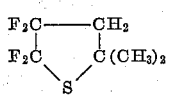

B.P., 74–75° C. at 100 mm.

*Analysis.*—Calc'd for $C_6H_8F_4S$: C, 38.29; H, 4.28; F, 40.39; S, 17.04. Found: C, 38.45; H, 4.48; F, 40.76; S, 17.02.

Nuclear magnetic resonance analysis confirmed the assigned structure.

*Example V*

In this example, the unsaturate reacted with tetrafluoroethylene and sulfur was 1-vinyl-2,2,3,3-tetrafluorocyclobutane,

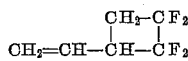

which was made in situ from 1,3-butadiene and tetrafluoroethylene (see U.S. Patent 2,462,347).

A mixture of 6.4 g. (0.20 mole) of sulfur, 8 g. (0.15 mole) of 1,3-butadiene and 30 g. (0.30 mole) of tetrafluoroethylene in 20 ml. of carbon disulfide was heated at 150° C. for 4.5 hours under autogenous pressure. Distillation of the reaction product gave 19.4 g. of 5-(2',2',3',3'-tetrafluorocyclobutyl)-2,2,3,3-tetrafluorothiolane,

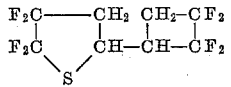

as a pale yellow liquid boiling between 106° C. at 80 mm. and 91° C. at 16 mm. This product was a mixture of the two possible racemates. Refractionation gave pure samples of these racemic forms, having the following boiling points: (A) 76–77° C. at 16 mm. and (B), 80° C. at 10 mm.

*Analysis.*—Calc'd for $C_8H_6F_8S$: C, 33.57; H, 2.11; F, 53.11; S, 11.20. Found for (A): C, 34.01; H, 2.36; F, 52.95; S, 12.22. Found for (B): C, 33.81; H, 2.33; F, 52.73; S, 11.94.

The nuclear magnetic resonance and infrared spectra of (A) and (B) are similar but not identical, and they support the assigned structure.

In this reaction there were also obtained small amounts of 1-vinyl-2,2,3,3-tetrafluorocyclobutane,

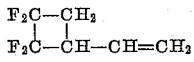

and other products.

*Example VI*

A mixture of 4.8 g. (0.15 mole) of sulfur, 15.6 g. (0.15 mole) of styrene containing a small amount of a polymerization inhibitor and 17 g. (0.17 mole) of tetrafluoroethylene in 10 ml. of carbon disulfide was heated at 150° C. for 6 hours under autogenous pressure. Distillation of the product gave 7 g. of 5-phenyl-2,2,3,3-tetrafluorothiolane,

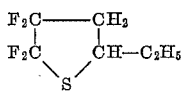

as a yellow oil with a pleasant odor boiling at 102–103° C. at 10 mm., whose identity was confirmed by infrared and nuclear magnetic resonance spectra.

*Analysis.*—Calc'd for $C_{10}H_8F_4S$: C, 50.84; H, 3.41; F, 32.17; S, 13.57. Found: C, 51.48; H, 3.66; F, 32.52; S, 14.24.

There was also formed in this reaction 14.8 g. of 1-phenyl-2,2,3,3-tetrafluorocyclobutane, B.P. 72–73° C. at 10 mm., which was identified by its nuclear magnetic resonance spectrum.

*Example VII*

A mixture of 6.4 g. (0.20 mole) of sulfur, 16.4 g. (0.20 mole) of cyclohexene and 26 g. (0.26 mole) of tetrafluoroethylene in 10 ml. of carbon disulfide was heated at 150° C. for 5 hours under autogenous pressure. Distillation of the reaction product gave 10 g. of a pale yellow liquid with a mild odor boiling at 94° C. at 20 mm. This was 4,5-tetramethylene-2,2,3,3-tetrafluorothiolane

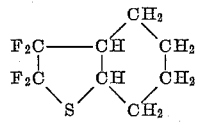

*Analysis.*—Calc'd for $C_8H_{10}F_4S$: C, 44.85; H, 4.71; F, 35.48; S, 14.97. Found: C, 45.39; H, 4.83; F, 35.69; S, 14.88.

The nuclear magnetic resonance spectrum agreed with the assigned structure, and showed the presence of two isomers. This corresponds to the two possible racemates, one of which has the five-membered ring attached in a trans configuration to the six-membered ring.

*Example VIII*

A mixture of 8 g. (0.25 mole) of sulfur, 10.6 g. (0.20 mole) of inhibited acrylonitrile and 30 g. (0.30 mole) of tetrafluoroethylene in 20 ml. of carbon disulfide was heated at 150° C. for 7 hours under autogenous pressure. Distillation of the reaction product gave, as a first fraction, 9.4 g. of 2,2,3,3-tetrafluorocyclobutanecarbonitrile

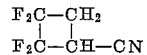

B.P., 89–91° C. at 120 mm., whose identity was confirmed by its nuclear magnetic resonance spectrum; and 7.4 g. of a light yellow oil, B.P. 112° C. at 50 mm., which was shown by elemental analysis and infrared and nuclear magnetic resonance spectroscopy to be 5-cyano-2,2,3,3-tetrafluorothiolane

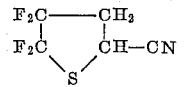

*Analysis.*—Calc'd for $C_5H_3F_4NS$: C, 32.43; H, 1.63; F, 41.05; N, 7.59; S, 17.32. Found: C, 32.17; H, 1.85; F, 40.54; N, 7.34; S, 17.78.

*Example IX*

A mixture of 6.4 g. (0.20 mole) of sulfur, 21 g. (0.36 mole) of allyl alcohol and 21 g. (0.21 mole) of tetrafluoroethylene was heated at 150° C. for 9 hours under autogenous pressure. Distillation of the liquid product gave 13.5 g. of 5-hydroxymethyl-2,2,3,3-tetrafluorothiolane

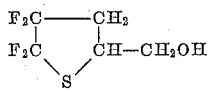

B.P., 102° C. at 20 mm.

*Analysis.*—Calc'd for $C_5H_6F_4OS$: C, 31.58; H, 3.18; F, 39.97; S, 16.86. Found: C, 31.76; H, 3.51; F, 39.64; S, 16.32.

The nuclear magnetic resonance spectrum confirmed the assigned structure.

Example X

A mixture of 6.4 g. (0.20 mole) of sulfur, 14.4 g. (0.20 mole) of ethyl vinyl ether and 20 g. (0.20 mole) of tetrafluoroethylene in 15 ml. of carbon disulfide was heated at 150° C. for 6 hours under autogenous pressure. Distillation of the reaction product gave 13.2 g. of 5-ethoxy-2,2,3,3-tetrafluorothiolane

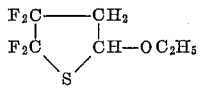

B.P., 90° C. at 60 mm., whose structure was confirmed by nuclear magnetic resonance analysis.

*Analysis.*—Calc'd for $C_6H_8F_4OS$: C, 35.29; H, 3.92; F, 37.22; S, 15.70. Found: C, 35.48; H, 4.12; F, 37.10; S, 15.28.

Example XI

A mixture of 4.8 g. (0.15 mole) of sulfur, 14 g. (0.15 mole) of 3,3,3-trifluoropropene and 15 g. (0.15 mole) of tetrafluoroethylene in 25 ml. of carbon disulfide was heated at 150° C. for 8.5 hours under autogenous pressure. Distillation of the reaction product gave 3.8 g. of 5-trifluoromethyl-2,2,3,3-tetrafluorothiolane

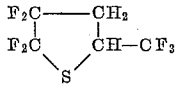

B.P., 98° C. The structure was confirmed by nuclear magnetic resonance analysis.

*Analysis.*—Calc'd for $C_5H_3F_7S$: C, 26.32; H, 1.33; F, 58.30; S, 14.05. Found: C, 26.52; H, 1.57; F, 58.31; S, 13.95.

Example XII

A mixture of 8 g. (0.25 mole) of sulfur, 14 g. (0.15 mole) of inhibited methyl acrylate and 25.1 g. (0.25 mole) of tetrafluoroethylene in 15 ml. of carbon disulfide was heated at 150° C. for 4 hours under autogenous pressure. There was obtained by fractionation of the reaction product 5.2 g. of methyl 2,2,3,3-tetrafluorocyclobutanecarboxylate,

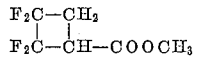

B.P., 74–76° C. at 100 mm., whose identity was confirmed by its nuclear magnetic resonance spectrum; and 4.4 g. of a liquid boiling at 80–81° C. at 20 mm., which was 5-carbomethoxy-2,2,3,3,-tetrafluorothiolane,

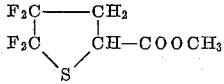

as shown by elemental analysis and nuclear magnetic resonance analysis.

*Analysis.*—Calc'd for $C_6H_6F_4O_2S$: C, 33.18; H, 2.33; F, 35.00; S, 14.76. Found: C, 33.42; H, 3.43; F, 35.33; S, 14.99.

Example XIII

A mixture of 6.4 g. (0.20 mole) of sulfur, 17.2 g. (0.20 mole) of inhibited vinyl acetate and 25 g. (0.25 mole) of tetrafluoroethylene in 15 ml. of carbon disulfide was heated at 150° C. for 12 hours under autogenous pressure. Distillation of the liquid reaction product gave, besides 4.4 g. of unreacted vinyl acetate, 2.4 g. of 1-acetoxy-2,2,3,3-tetrafluorocyclobutane,

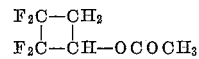

B.P., 68–72° C. at 60 mm., identified by its nuclear magnetic resonance spectrum; and 8.3 g. of 5-acetoxy-2,2,3,3-tetrafluorodithiolane,

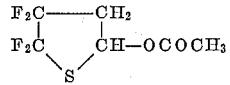

as a yellow, sweet-smelling oil boiling at 106° C. at 50 mm.

*Analysis.*—Calc'd for $C_6H_6F_4O_2S$: C, 33.18; H, 2.33; F, 35.00; S, 14.76. Found: C, 33.14; H, 2.82; F, 35.44; S, 14.81.

The identity of this material was confirmed by its nuclear magnetic resonance spectrum.

Example XIV

A mixture of 6.4 g. (0.20 mole) of sulfur, 13 g. (0.21 mole) of vinyl chloride, 20 g. (0.20 mole) of tetrafluoroethylene and 20 ml. of carbon disulfide was heated at 150° C. for 7 hours under autogenous pressure. Distillation of the liquid product gave 14.1 g. of 5-chloro-2,2,3,3-tetrafluorothiolane,

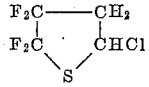

as a liquid boiling at 85° C. at 170 mm. pressure.

*Analysis.*—Calc'd for $C_4H_3ClF_4S$: C, 26.49; H, 1.55; Cl, 18.22; F, 39.96; S, 16.48. Found: C, 26.43; H, 1.72; Cl, 18.14; F, 39.21; S, 16.27.

The nuclear magnetic resonance spectrum confirmed the assigned structure.

Example XV

A mixture of 8 g. (0.25 mole) of sulfur, 9.8 g. (0.10 mole) of maleic anhydride, 25 g. (0.25 mole) of tetrafluoroethylene and 0.4 g. (0.0015 mole) of iodine (used as a reaction catalyst) in 15 ml. of carbon disulfide was heated at 150° C. for 6 hours under autogenous pressure. The reaction product gave on distillation 8.2 g. of a material boiling at 150–200° C. at 1 mm. This product was then heated up to 90° C. under 0.1 mm. pressure to drive off some unchanged maleic anhydride. The solid residue, on recrystallization from cyclohexene, gave white needles melting at 68–69° C.

*Analysis.*—Calc'd for $C_6H_2F_4O_3S$: C, 31.31; H, 0.88; F, 33.02; S, 13.93. Found: C, 31.69; H, 1.30; F, 33.51; S, 13.67.

The elemental analysis indicated, and the nuclear magnetic resonance spectrum confirmed, that this product was 2,2,3,3-tetrafluorothiolane-4,5-dicarboxylic anhydride,

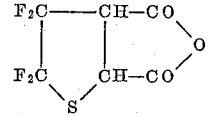

Example XVI

A mixture of 6.4 g. (0.20 mole) of sulfur, 9 g. (0.21 mole) of propylene and 25 g. (0.21 mole) of chlorotrifluoroethylene in 20 ml. of carbon disulfide was heated at 150° C. for 6 hours under autogenous pressure. Distillation of the reaction product gave 12 g. of a liquid boiling at 95–96° C. at 100 mm., which elemental analysis and nuclear magnetic resonance analysis indicated to be 5-methyl-3-chloro-2,2,3-trifluorothiolane,

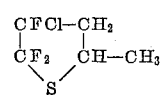

*Analysis.*—Calc'd for C₅H₆ClF₃S: C, 31.50; H, 3.17; Cl, 18.60; F, 29.90; S. 16.82. Found: C, 31.73; H, 3.15; Cl, 18.45; F, 30.33; S, 17.08.

The nuclear magnetic resonance spectrum indicated that the product was a mixture of the two possible racemic forms.

Example XVII

A mixture of 6.4 g. (0.20 mole) of sulfur, 11 g. (0.26 mole) of propylene and 40 g. (0.25 mole) of bromotrifluoroethylene in 20 ml. of carbon disulfide was heated at 150° C. for 6 hours under autogenous pressure. Distillation of the liquid product gave 16.9 g. of 5-methyl-3-bromo-2,2,3-trifluorothiolane,

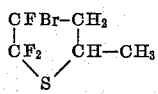

B.P. 93° C. at 50 mm.

*Analysis.*—Calc'd for C₅H₆BrF₃S: C, 25.54; H, 2.57; Br, 34.00; F, 24.25; S, 13.64. Found: C, 25.84; H, 2.54; Br, 33.78; F, 24.62; S, 13.66.

Analysis by nuclear magnetic resonance fitted a mixture of racemates of the assigned structure in which bromine is cis and trans on the ring to the methyl group.

Example XVIII

A mixture of 6.4 g. (0.20 mole) of sulfur, 9 g. (0.21 mole) of propylene and 27 g. (0.20 mole) of 1,1-dichloro-2,2-difluoroethylene in 20 ml. of carbon disulfide was heated at 150° C. for 6 hours under autogenous pressure. Distillation of the liquid product gave a small amount of 5-methyl-3,3-dichloro-2,2-difluorothiolane,

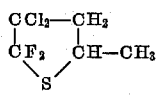

B.P. 78–80° C. at 20 mm., which was identified by nuclear magnetic resonance analysis.

Example XIX

A mixture of 15.8 g. (0.20 mole) of selenium, 9 g. (0.21 mole) of propylene, 20 g. (0.20 mole) of tetrafluoroethylene and 12.7 g. (0.05 mole) of iodine in 20 ml. of carbon disulfide was heated at 150° C. for 15 hours under autogenous pressure. Distillation of the liquid reaction product gave 3.6 g. of 5-methyl-2,2,3,3-tetrafluoroselenolane,

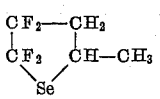

B.P. 82–85° C. at 100 mm.

*Analysis.*—Calc'd for C₅H₆F₄Se: C, 27.16; H, 2.74; F, 34.38; Se, 35.72. Found: C, 27.21; H, 3.00; F, 34.02; Se, 35.20.

The nuclear magnetic resonance spectrum confirmed the assigned structure.

The new products made available by this invention are the 2,2-difluoro-3,3-dihalothiolanes and selenolanes obtained by reacting together (a) a 1,1-difluoro-2,2-dihaloethylene of the formula CF₂=C(X)(X'), where X and X', which can be alike or different, represent fluorine, chlorine or bromine; (b) sulfur or selenium; and (c) an unsaturate of up to 14 carbon atoms having one of the formulas

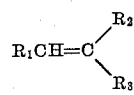

where R₁ is hydrogen or alkyl of 1 to 6 carbon atoms; R₂ is hydrogen, halogen or alkyl of 1 to 6 carbon atoms; and R₃ is hydrogen, halogen, cyano, hydroxymethyl, hydrocarbon or halohydrocarbon of 1 to 6 carbon atoms free of non-aromatic unsaturation, —OR₄, —COOR₄, or —OCOR₄, R₄ being hydrocarbon of 1 to 6 carbon atoms free of non-aromatic unsaturation, at least one of R₁, R₂ and R₃ being hydrogen, and the substituents R₁, R₂ and R₃ together having a total of not more than 12 carbon atoms; and

where Z is a divalent polymethylene radical of 2 to 4 carbon atoms or the anhydride radical

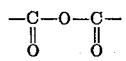

The foregoing examples have illustrated a number of reaction products obtained from various reactants of this class. Other examples of thiolanes and selenolanes which are obtained by application of the described process are listed in the following table, in which the first column shows the structural formula of the reaction products and the second column shows the three reactants used:

| Reaction Product | Reactants |
|---|---|
| Cl₂C—CH₂<br>\|      \|<br>F₂C   CH—C₃H₇<br>  \\  /<br>   S | CF₂=CCl₂, S and pentene-1. |
| F₂C—CH₂<br>\|      \|<br>F₂C   CH—C₄H₉<br>  \\  /<br>   Se | CF₂=CF₂, Se and hexene-1. |
| F₂C—CH₂<br>\|      \|<br>F₂C   CH—C₆H₁₃<br>  \\  /<br>   S | CF₂=CF₂, S and octene-1. |
| F₂C—CH—C₆H₁₃<br>\|      \|<br>F₂C   CH—C₆H₁₃<br>  \\  /<br>   S | CF₂=CF₂, S and tetradecene-7. |
| F₂C—CH—CH₃<br>\|      \|<br>F₂C   CH—C₆H₅<br>  \\  /<br>   S | CF₂=CF₂, S and β-methylstyrene. |
| BrFC—CH<br>\|      \|<br>F₂C   CH—C₆H₁₁<br>  \\  /<br>   Se | CF₂=CFBr, Se and vinylcyclohexane. |

| Reaction Product | Reactants |
|---|---|
| $\begin{array}{c} F_2C\text{------}CH_2 \\ F_2C\phantom{xx}C-CH_3 \\ \phantom{xx}S\phantom{xxx}CH_2-C(CH_3)_3 \end{array}$ | $CF_2=CF_2$, S and diisobutylene (2,4,4-trimethyl-pentene-1). |
| $\begin{array}{c} F_2C\text{------}CH_2 \\ F_2C\phantom{xx}CHF \\ \phantom{xx}S \end{array}$ | $CF_2=CF_2$, S and vinyl fluoride. |
| $\begin{array}{c} F_2C\text{------}CH_2 \\ F_2C\phantom{xx}C-CH_3 \\ \phantom{xx}S\phantom{xxx}Br \end{array}$ | $CF_2=CF_2$, S and 2-bromopropene. |
| $\begin{array}{c} F_2C\text{------}CH_2 \\ F_2C\phantom{xx}CH-CH_2I \\ \phantom{xx}Se \end{array}$ | $CF_2=CF_2$, Se and allyl iodide. |
| $\begin{array}{c} Cl_2C\text{------}CH_2 \\ F_2C\phantom{xx}CCl_2 \\ \phantom{xx}S \end{array}$ | $CF_2=CCl_2$, S and 1,1-dichloroethylene. |
| $\begin{array}{c} F_2C\text{------}CH_2 \\ F_2C\phantom{xx}CF_2 \\ \phantom{xx}S \end{array}$ | $CF_2=CF_2$, S and 1,1-difluoroethylene. |
| $\begin{array}{c} F_2C\text{------}CH_2 \\ F_2C\phantom{xx}C-CH_3 \\ \phantom{xx}S\phantom{xxx}CH_2Cl \end{array}$ | $CF_2=CF_2$, S and methallyl chloride. |
| $\begin{array}{c} F_2C\text{------}CH_2 \\ F_2C\phantom{xx}C-C_6H_5 \\ \phantom{xx}S\phantom{xxx}Cl \end{array}$ | $CF_2=CF_2$, S and α-chlorostyrene. |
| $\begin{array}{c} F_2C\text{------}CH_2 \\ F_2C\phantom{xx}CH-C_6H_4Cl \\ \phantom{xx}S \end{array}$ | $CF_2=CF_2$, S and p-chlorostyrene. |
| $\begin{array}{c} Br_2C\text{------}CH_2 \\ F_2C\phantom{xx}CH-CHBr-CH_2Br \\ \phantom{xx}S \end{array}$ | $CF_2=CBr_2$, S and 3,4-dibromobutene-1. |
| $\begin{array}{c} F_2C\text{------}CH_2 \\ F_2C\phantom{xx}C-F \\ \phantom{xx}S\phantom{xxx}C_2F_5 \end{array}$ | $CF_2=CF_2$, S and 2,3,3,4,4,4-hexafluorobutene-1. |
| $\begin{array}{c} F_2C\text{------}CH_2 \\ F_2C\phantom{xx}C-CH_3 \\ \phantom{xx}S\phantom{xxx}CF_2-CFH-C_3H_7 \end{array}$ | $CF_2=CF_2$, S and 3,3,4,5,5,6,6,7,7,7-decafluoro-2-methylheptene-1. |
| $\begin{array}{c} F_2C\text{------}CH_2 \\ F_2C\phantom{xx}C-CH_3 \\ \phantom{xx}S\phantom{xxx}CN \end{array}$ | $CF_2=CF_2$, S and methacrylonitrile. |
| $\begin{array}{c} F_2C\text{------}CH_2 \\ F_2C\phantom{xx}C-C_6H_5 \\ \phantom{xx}Se\phantom{xx}CN \end{array}$ | $CF_2=CF_2$, Se and α-phenylacrylonitrile. |
| $\begin{array}{c} F_2C\text{------}CH-CH_3 \\ F_2C\phantom{xx}CH-CH_2OH \\ \phantom{xx}S \end{array}$ | $CF_2=CF_2$, S and crotyl alcohol. |
| $\begin{array}{c} F_2C\text{------}CH_2 \\ F_2C\phantom{xx}CH-O-C_6H_{13} \\ \phantom{xx}S \end{array}$ | $CF_2=CF_2$, S and vinyl n-hexyl ether. |
| $\begin{array}{c} ClFC\text{------}CH_2 \\ F_2C\phantom{xx}CH-O-C_6H_5 \\ \phantom{xx}S \end{array}$ | $CF_2=CFCl$, S and phenyl vinyl ether. |
| $\begin{array}{c} F_2C\text{------}CH-CH_3 \\ F_2C\phantom{xx}CH-O-CH_3 \\ \phantom{xx}Se \end{array}$ | $CF_2=CF_2$, Se and methyl propenyl ether. |

| Reaction Product | Reactants |
|---|---|
| F₂C——CH₂<br>F₂C  CH—COOC₆H₁₁<br>  \S/ | CF₂=CF₂, S and cyclohexyl acrylate. |
| F₂C——CH₂<br>F₂C  C—CH₃<br>  \S/  \COOCH₃ | CF₂=CF₂, S and methyl methacrylate. |
| F₂C——CH₂<br>F₂C  C—Cl<br>  \S/  \COOCH₃ | CF₂=CF₂, S and methyl α-chloroacrylate. |
| BrFC——CH—CH₃<br>F₂C  CH—O—COCH₃<br>  \S/ | CF₂=CFBr, S and propenyl acetate. |
| F₂C——CH₂<br>F₂C  CH—O—COC₅H₁₃<br>  \S/ | CF₂=CF₂, S and vinyl hexanoate. |
| F₂C——CH₂<br>F₂C  CH—O—COC₆H₅<br>  \S/ | CF₂=CF₂, S and vinyl benzoate. |
| F₂C——CH—CH₂<br>F₂C  CH—CH₂<br>  \S/ | CF₂=CF₂, S and cyclobutene. |
| F₂C——CH—CH₂<br>          \CH₂<br>F₂C  CH—CH₂<br>  \S/ | CF₂=CF₂, S and cyclopentene. |

The heterocyclic compounds of this invention have a variety of uses. As a class, they are characterized by good stability towards heat, oxygen and light. This inertness makes them useful as heat exchange fluids, either in the gaseous state or in the liquid state. In the latter case, the products which are normally solid can be used as melts, as well as the products which are normally liquid.

Another characteristic of the class is the high solvent power for a wide variety of compounds which its members possess. This property makes them useful as stable solvents. A specific illustration of this solvent power is the ability of these products to remove grease and oil from metals, textiles and other soiled objects. For example, the 5,5-dimethyl-2,2,3,3-tetrafluorothiolane of Example IV and the 5-acetoxy-2,2,3,3-tetrafluorothiolane of Example XIII, when used in the vapor or in the liquid phase, effectively remove grease from steel. For this purpose the normally solid products can be used as melts.

Since the heterocyclic products of this invention contain at least four halogen atoms, they are as a class difficultly combustible. Those which are sufficiently rich in halogen do not support combustion. For example, the adducts of Examples V, XI, XIV, XVI, and XVII extinguish a burning cotton wad soaked in xylene when sprayed on the fire. Such products are useful as fire retardants or fire-extinguishing materials, and provide safe solvents for use, for example, in insecticidal compositions, aerosol bombs, and the like.

Those products which are hydrocarbon except for the 2,2-difluoro-3,3-dihalothiolane group are useful, in the liquid or molten phase, as inert polymerization media for perfluoroethylenes. For example, heating tetrafluoroethylene with tertiary butyl hydroperoxide as a catalyst in the 2,2,3,3-tetrafluorothiolane of Example I at 75° C. under autogenous pressure for a few hours gave a 70% yield of polytetrafluoroethylene. The polymer contained no sulfur, indicating that the polymerization medium did not participate in the reaction.

Another property possessed by the products of this invention as a class is biological activity towards the lower forms of life. This property manifests itself principally in the control of fungi and bacteria. These compounds are therefore useful as active ingredients of compositions for agricultural uses involving such control. For example, the 5-methyl-2,2,3,3-tetrafluorothiolane of Example II is a fungicide showing good activity against tomato early blight and apple scab; the 5-phenyl-2,2,3,3-tetrafluorothiolane of Example VI is likewise a fungicide, showing considerable activity against tomato early blight, and it also shows activity as a nematocide; the 4,5-tetramethylene-2,2,3,3-tetrafluorothiolane of Example VII is a soil nematocide; the 5-cyano-2,2,3,3-tetrafluorothiolane of Example VIII is a systemic fungicide and shows activity against tomato early blight; the 5-acetoxy-2,2,3,3-tetrafluorothiolane of Example XIII, besides possessing fungicidal action, is active as a soil fumigant and as a soil nematocide; the 2,2,3,3-tetrafluorothiolane-4,5-dicarboxylic anhydride of Example XV is active against tomato early blight and as a soil nematocide.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of a formula selected from the group consisting of

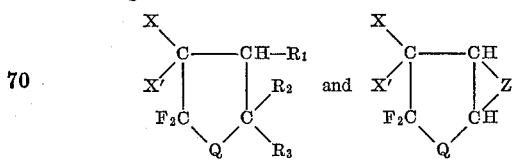

wherein Q is a chalcogen of atomic number 16-34; X and X' are halogen of atomic number 9-35; R₁ is selected from the group consisting of hydrogen and alkyl of 1-6 carbons; $R_2$ is selected from the group consisting of hydrogen, halogen and alkyl of 1-6 carbons; $R_3$ is selected from the group consisting of hydrogen, halogen, cyano, hydroxymethyl, hydrocarbon and halohydrocarbon of 1-6 carbons free of non-aromatic unsaturation, —$OR_4$, —$COOR_4$ and —$OCOR_4$, $R_4$ being hydrocarbon of 1-6 carbons free of non-aromatic unsaturation; at least one of $R_1$, $R_2$ and $R_3$ being hydrogen, and $R_1$, $R_2$ and $R_3$ together having a total of up to 12 carbons; and Z is selected from the group consisting of divalent polymethylene of 2-4 carbons and $$-\overset{\overset{O}{\|}}{C}-O-\overset{\overset{O}{\|}}{C}-$$

2. The compound of the formula

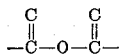

3. The compound of the formula

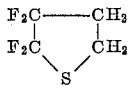

4. The compound of the formula

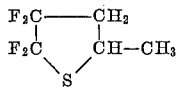

5. The compound of the formula

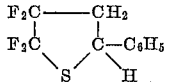

6. The compound of the formula

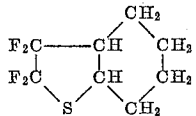

7. The compound of the formula

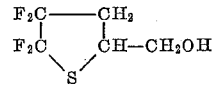

8. The compound of the formula

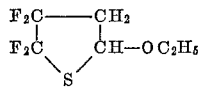

9. The compound of the formula

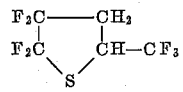

10. The compound of the formula

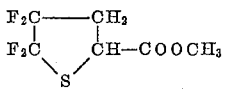

11. The compound of the formula

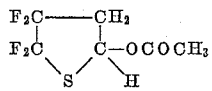

12. The compound of the formula

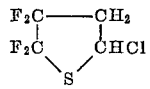

13. The compound of the formula

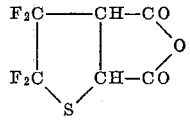

References Cited in the file of this patent

UNITED STATES PATENTS

| | | |
|---|---|---|
| 2,160,915 | Schreiber | June 6, 1939 |
| 2,931,803 | Krespan | Apr. 5, 1960 |
| 2,932,651 | Ilgenfritz et al. | Apr. 12, 1960 |
| 2,939,871 | Pyne et al. | June 7, 1960 |

UNITED STATES PATENT OFFICE
CERTIFICATE OF CORRECTION

Patent No. 3,149,124                        September 15, 1964

Carl G. Krespan

It is hereby certified that error appears in the above numbered patent requiring correction and that the said Letters Patent should read as corrected below.

Column 15, lines 13 to 15, the formula should appear as shown below instead of as in the patent:

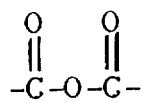

Signed and sealed this 9th day of March 1965.

(SEAL)
Attest:

ERNEST W. SWIDER                        EDWARD J. BRENNER
Attesting Officer                          Commissioner of Patents